Nov. 17, 1931.  W. A. KNOOP  1,832,309
SYNCHRONOUS TELEGRAPH SYSTEM
Filed Dec. 4, 1929  2 Sheets-Sheet 1
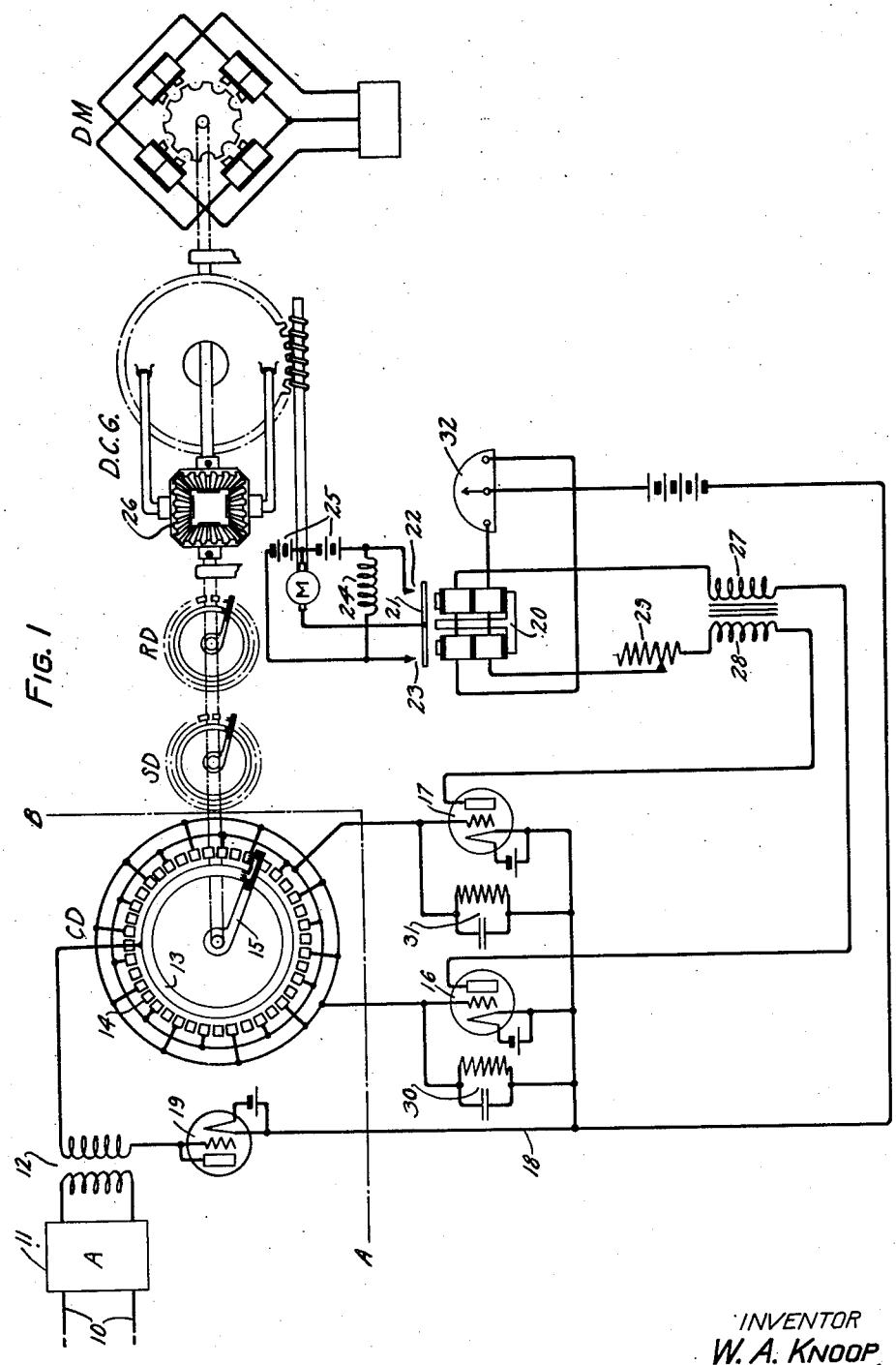
INVENTOR
W. A. KNOOP
BY
J. W. Schmied
ATTORNEY

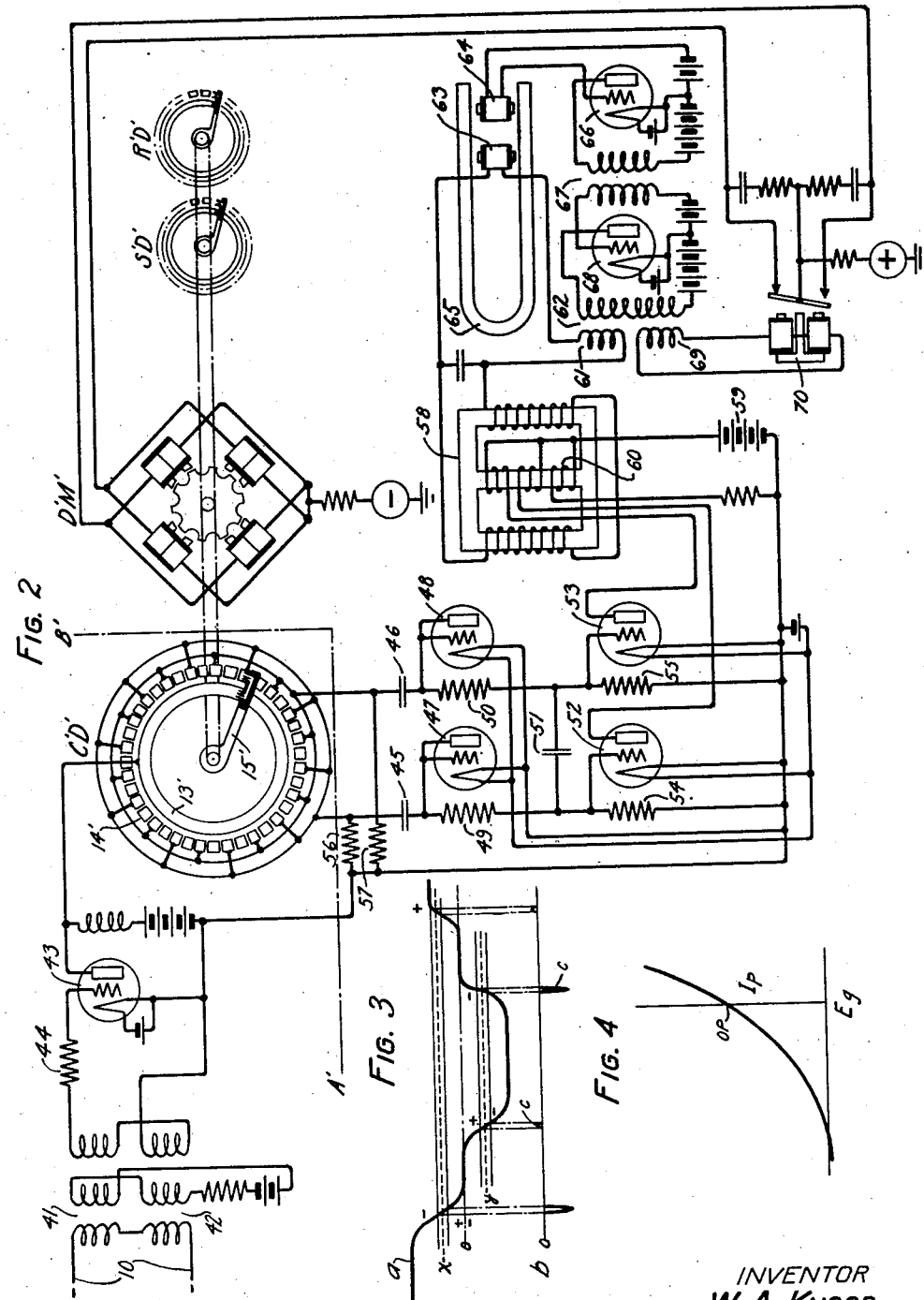

Patented Nov. 17, 1931

1,832,309

UNITED STATES PATENT OFFICE

WILLIAM A. KNOOP, OF HEMPSTEAD, NEW YORK, ASSIGNOR TO BELL TELEPHONE LABORATORIES, INCORPORATED, OF NEW YORK, N. Y., A CORPORATION OF NEW YORK

SYNCHRONOUS TELEGRAPH SYSTEM

Application filed December 4, 1929. Serial No. 411,407.

This invention relates to synchronous communication systems and particularly to high speed printing telegraph systems.

The general object of the invention is to maintain in a positive manner and with exactness, synchronism between transmitting and receiving apparatus at separated points.

A more specific object is to continuously maintain synchronism by causing the receiving apparatus to run as nearly as possible at the same speed as that of associated transmitting apparatus. This is in contrast to systems in which the receiver runs at a speed inherently different from that of the transmitter and is periodically corrected to synchronism with the transmitter.

A feature of the invention comprises means for the balancing of one against the other and producing a differential effect therefrom of two portions of a received impulse which have steep and opposite slopes whereby a small departure from synchronism will produce a relatively great correcting effect.

The system of the present invention avoids the difficulties inherent in systems wherein one distributor is run faster or slower than the other and requires constant correction; it avoids the use of mechanical relays as elements of the correction control circuit; and it also renders unnecessary the splitting of impulses into two parts by pairs of segments connected into two different circuits.

A principle underlying the operation of systems in accordance with the present invention is that of selecting from a received impulse (or impulse derived from a received impulse) two small parts from regions which are rapidly and oppositely changing in amplitude and determining the corrective effect if any by balancing these parts against one another.

In the drawings, Fig. 1 shows a signal receiving circuit wherein the correction is effected through the operation of a relay and a differential gear mechanism;

Fig. 2 illustrates a modification of Fig. 1, wherein the correction is effected through a vibrating fork;

Fig. 3 shows the signaling current received in the circuit of Fig. 2 and the impulses produced thereby on the correction distributor; and Fig. 4 shows the plate current-grid potential characteristic of the vacuum tube amplifier employed in Fig. 2 for impressing voltage impulses on the distributor segments.

In Fig. 1 the correction distributor CD, sending distributor SD and receiving distributor RD are mounted on a common shaft which is driven by a phonic wheel motor DM. Connected between the motor DM and the distributors is a differential gear corrector DGC which is adapted to be operated in either direction by another motor M when a loss of synchronism between the distributors shown and those at the distant station (not shown) occurs. The signal waves incoming over line 10 are repeated through an amplifier 11 and a transformer 12. Voltage impulses are produced in the secondary winding of transformer 12 and impressed on a circuit extending through continuous ring 13, segmented ring 14 and rotatable brush 15 of distributor CD, a pair of vacuum tube amplifiers 16 and 17 in differential relation, over conductor 18 and through a vacuum tube rectifier 19. When the plate of rectifier 19 is negative with respect to the filament thereof, no plate current will flow and therefore current will flow through the circuit, just traced, only when impulses of positive polarity are applied to the rectifier. The other end of the transformer 12 is of course negative when the rectifier end is positive so when positive pulses pass through the rectifier, negative pulses may be impressed on the correcting segments and tubes.

The distributor CD is shown adapted for two channels of five impulses each, but it is understood that a greater number of channels may be employed. The segmented ring comprises alternate live and dead segments. The live segments are alternately interconnected to form two multiples which are respectively connected to the grids of vacuum tubes 16 and 17. When the distributor CD is in synchronism with the transmitting distributor (not shown) at the opposite end of line 10, the rotatable brush 15 will be passing over equal portions of adjacent live segments separated by a dead segment, at the time a signal impulse is being received in the secondary winding of transformer 12. Impulses of only positive polarity flow through rectifier 19 and therefore each positive impulse will be equally impressed on the grids of tubes 16 and 17 during the time that brush 15 is passing over equal portions of the adjacent live segments. The middle portion of the impulse which is of a substantially uniform amplitude, is impressed on the dead segment intermediate the two adjacent live segments and therefore only rising and falling end portions of the impulse which have a rapidly varying intensity are impressed on the tubes 16 and 17. The plate circuits of tubes 16 and 17 respectively include two differential windings on a three-position polar relay 20. In normal operation, that is, when the distributors at opposite ends of line 10 are in synchronism, equal and opposite plate currents flow in the two windings of relay 20 and the armature 21 of the relay remains in a neutral position between contacts 22 and 23. Hence, the armature circuit of motor M, having a field 24 and a source of energizing current 25, is open. The correcting differential gear 26 therefore remains stationary and the distributor continues to rotate at uniform speed. Inductances 27 and 28 are respectively inserted in the plate circuits of tubes 16 and 17 to prevent sudden fluctuation in the plate current and variable resistance 29 is inserted in the plate circuit of one of the tubes to equalize the normal currents through the differential windings of relay 20 in case the characteristics of tubes 16 and 17 should differ slightly from each other. Connected in parallel with the grids of tubes 16 and 17 are shunted condensers 30 and 31 whereby the voltages impressed on the grids may be prolonged sufficiently to be effective in the windings of relay 20. The plate battery for tubes 16 and 17 is connected to the differential windings of relay 20 through a differential ammeter 32.

If a departure from synchronism occurs, the distributor brush 15 will lag or lead the received signals and the unequal synchronizing impulses will be applied to the grids of tubes 16 and 17. Therefore unequal currents will flow in the two windings of relay 20 and the relay armature 21 will operate to either of contacts 22 and 23 depending on whether the distributor brush is lagging or leading the incoming signals. This causes current to pass through the armature of motor M, of such a polarity as to cause the motor to shift the distributor brushes, through differential gears 26, in such a direction as to correct for phase displacement. Differential ammeter 32 provides visual means of determining the amount and direction of the departure from synchronism.

In Fig. 2 is shown another embodiment of the present invention wherein the objects of the invention are more effectively attained by eliminating the mechanical relay required to effect correction as shown in Fig. 1. Fig. 2 therefore shows a continuous correction system whereas Fig 1 shows the step-by-step type of system. In Fig. 2 the correcting distributor C'D', sending distributor S'D', receiving distributor R'D' and phonic wheel motor D'M' are mounted on a common shaft. The correcting distributor comprises a continuous ring 13', a segmented ring 14' and a rotatable brush 15'. The segmented ring 14' like ring 14 of Fig. 1 is divided into alternate live and dead segments, the alternate live segments being connected to form two multiples. The incoming signals are received in a pair of transformers 41 and 42 which preferably have high permeability cores of the type disclosed in copending application of E. T. Burton, Serial No. 280,709, filed May 26, 1928. These transformers are equipped with core material, such as permalloy, which have a high permeability at low magnetizing forces and have a magnetic circuit which becomes overloaded at low voltages of the signaling current. Therefore a signal wave of slowly varying intensities when received in the primary windings produces in the secondary windings, a wave of short, discrete impulses which occur while the magnetizing force is passing through values slightly above or below zero. By biasing the transformers magnetically in opposite directions the intervals in which the sharp impulses occur are shifted to the higher values of magnetic force so that two impulses are produced during the rise and fall of a signal wave on either the positive or negative side of the zero value. The impulses so produced by each signal wave are of opposite polarity and are produced in one or the other of the secondary windings depending upon the polarity or direction of the signal wave, that is, those caused by a positive wave are produced in one winding and those caused by a negative wave are produced in the other winding. The secondary windings are connected in series, but reversed with respect to each other in order to invert the impulses of one winding, thereby obtaining a positive impulse at the beginning and a negative impulse at the end of each signal wave regardless of the polarity of the wave. In the embodiment shown herein the impulses of negative polarity are utilized to effect correction and the impulses of positive polarity are practically eliminated. This is accomplished by connecting a vacuum tube amplifier 43 intermediate the secondary windings of transformers 41 and 42 and correction distributor C'D' and by providing in the grid circuit of such tube a high resistance 44. Therefore the voltage drop effected in the impulses of positive polarity is considerable and in such direction as to make the grid of tube 43 only slightly positive with respect to the filament, whereas the voltage drop encountered by the negative impulses is negligible and the grid is made negative with respect to the filament. The negative impulse is therefore effective to block the space current of tube 43 and to permit the full positive potential of the plate battery of tube 43 to be applied over the segments of distributor C'D' to the correction circuit to produce the correction impulses. The correction impulses are, of course, of positive polarity, there being two for each incoming negative signal impulse.

The two impulses are produced by means of distributor brush 15' in rotating over a group of three segments in the interim in which a negative impulse is being received in the amplifier 43 and the positive potential is being applied to the distributor. The middle segment of the group is dead and therefore when the positive potential is applied the middle portion of the voltage impulse is lost, but the two end portions in which the voltage intensity is changing rapidly, are respectively impressed over the two live segments of the group onto the correction circuit.

When the correcting distributor is in synchronous phase with the transmitting distributor at a distant station (not shown), brush 15' is passing over equal portions of the two live segments separated by a dead segment, at the time an impulse occurs in either of the secondary windings of the transformers, so that each live segment of a pair receives an equal part of the positive correcting impulse. The equal parts of the positive impulse are respectively impressed through condensers 45 and 46 onto the anodes of two vacuum tube rectifiers 47 and 48 as shown, wherein electrons are caused to flow from the cathodes to the anodes and thence to the lower plates of the condensers. When the positive charges are removed from the upper plates of condensers 45 and 46, the negative charges held on the lower plates are released and flow through resistances 49 and 50 respectively to opposite plates of a condenser 51 which acts as a reservoir.

If the correcting distributor is slightly out of phase with the transmitting distributor, the beginning and the end of each positive impulse will be impressed in unequal parts on the anodes of rectifiers 47 and 48 which will result in one of the rectifiers applying larger pulses to one side of the condenser 51 than to the other, thereby causing a difference of potential across the condenser 51. The opposite sides of condenser 51 are connected to the grids of vacuum tube amplifiers 52 and 53 respectively and any difference in the potentials across the condenser will cause unequal current in the plate circuits of the amplifier. If, however, the correcting distributor is operating substantially in phase with the transmitting distributor, but due to signal distortion an occasional wave of short correction impulses is applied to one of the tubes 47 and 48, these impulses will have little or no effect on the tubes 52 and 53 because of the delaying effect of resistances 49 and 50 and the storage condenser 51. In other words, there must be a continued, though slight, departure from synchronism of the correcting distributor before a correcting tendency is produced. This tends to stabilize the system and to prevent objectionable hunting which might occur if the correction system responded to a single unequal impulse from the transmitting distributor. Resistances 54 and 55, which are of high value compared with resistances 49 and 50, provide leak paths for condenser 51. Resistances 56 and 57 which are of relatively low value, provide leak paths for the relatively large capacity condensers 45 and 46.

The plate circuits of amplifiers 52 and 53 respectively extend through two windings of a variable reactance coil 58 to a common source of battery supply 59. These windings of the coil are connected in opposite relation so that when the correcting distributor is in phase with the transmitting distributor, any magnetic fields set up by the plate currents of equal value will cancel each other.

The variable reactance coil 58 comprises a core constructed of a magnetic material such as a high permeability nickel-iron alloy, the permeability of which varies with the magnetizing force, and which has a low coercive force in order that slight changes in the magnetizing force may produce corresponding changes in the flux density. The core is magnetically biased from the current source 59 through winding 60 so that the flux density is maintained at such a mean average value that small changes in the magnetizing force will produce large and approximately proportional changes in the permeability. In other words, it is desired to work on the steepest part of the permeability curve. The core is equipped with a fourth winding connected with the circuit extending through a secondary winding 61 on transformer 62 and the winding of magnet 63. This circuit forms a part of a vacuum tube tuning fork circuit arrangement wherein a pick-up magnet 64 is arranged in the magnetic field of the vibrating fork 65 and adapted to impress the frequency of the fork on a pick-up vacuum tube 66, transformer 67, a fork-drive vacuum tube 68 and the primary winding of transformer 62 in series. The output of vacuum tube 68 is impressed on winding 61 of transformer 62 which causes the fork frequency current to flow through the winding of magnet 63 and the fourth winding of coil 58, the current flowing through magnet 63 being employed to drive the vibrating fork 65. Another secondary winding 69 of transformer 62 also receives the output of vacuum tube 68 to operate the motor relay 70 whereby phonic wheel motor D'M' is operated to drive the distributors.

The type of variable reactance coil used in the present invention preferably has a shell type core. On the two outside legs is mounted the alternating current winding of the fork-drive circuit and on the middle leg are mounted the two modulating windings of the plate circuits of amplifiers 52 and 53 and the biasing winding 60. With this form of reactance coil, practically no alternating current is produced in either the biasing or modulating windings. The alternating current flux circulates around the two outside legs and the biasing current flux flows from the middle leg and returns through the outside legs in parallel. The biasing current thus saturates the outside legs and thereby reduces their permeability, and therefore, the reactance of their windings to the alternating current.

When unequal currents, due to correction impulses received when the correcting distributor loses phase, flow in the plate circuits of vacuum tubes 52 and 53, the operating impedance of the coil 58 to the alternating current in the fourth winding is increased or decreased depending on whether the correcting distributor is going fast or slow. This changes the reactance of the variable reactance coil and in turn changes the power fed to maintain the fork in vibration. This causes the amplitude of vibration of the fork to change and the fork is so adjusted that a change of amplitude causes a change of damping. The damping in turn affects the fork frequency and there is then a corresponding change in the motor speed.

In Fig. 3 is a graphic representation of the operation of transformers 41 and 42 in response to an incoming signal wave illustrated by curve a. The transformers are magnetically biased to be non-responsive to the signal wave until the current reaches values indicated in the drawings by broken lines $x$ and $y$. Thus only signal waves above a certain value will be effective to produce voltage impulses in the secondary winding. Curve $b$ shows two voltage impulses produced in the secondary windings every time the signal wave passes through the values indicated by broken lines $x$ and $y$. Ordinarily when the secondary windings are connected in the same direction with respect to each other, an impulse of positive polarity will be produced with every rise in value of a positive signal and for every drop in value of a negative signal wave, and a negative impulse is produced with every drop in value of the positive signal wave and every rise in value of the negative signal wave, it being understood, however, that the increases and decreases in value of the signal wave pass through the values indicated by broken lines $x$ and $y$. But when the secondary windings of one of the transformers is reversed, as stated above, the impulses produced in one of the secondary windings will likewise be reversed, such as shown in curve $b$ by the impulses designated $c$ which are produced by the negative signal waves shown directly above them. It will be noted that the positive impulses in curve $b$ are suppressed to an amplitude where they are hardly discernible. This is due, as stated above, to the effect of high resistance 44 on the secondary impulses of positive polarity.

Fig. 4 shows the plate current-grid potential characteristic of vacuum tube 43 used in conjunction with high resistance 44, wherein no grid battery is employed and the operating point OP is located approximately at the middle of the straight line portion of the characteristic. The operating point when so located provides a greater operating range for impulses of negative polarity than those of positive polarity.

It is understood that the segments of the correcting distributor may have their lengths chosen in various ways, for example, when the impulse is produced in a secondary winding of a transformer connected to line 10 have sharp peaks, no middle segments are required for the respective groups of segments, but when the impulses are flat at the top the middle segments are employed, their lengths being directly proportional to the lengths of the flat-topped portions.

It is also understood that the correction circuit of Fig. 2 shown below and to the right of dotted line A'—B' may be substituted for that part of the circuit of Fig. 1 shown below and to the right of dotted line A—B, and vice versa.

What is claimed is:

1. The method of causing a synchronous device to remain closely in phase with another synchronous device by means of a series of impulses over a circuit, which comprises suppressing a portion of each impulse and selecting the rapidly changing portions of each impulse to produce a plurality of pulses of one polarity, and impressing said plurality of pulses on a plurality of other circuits arranged in differential relation with each other for maintaining the desired phase relation.

2. A system for correction of phase departure in synchronous apparatus comprising means for receiving a series of incoming impulses with which a local rotary device is to be synchronized, means for driving said device, means for suppressing the middle portion of each impulse and for selecting rapidly changing portions of each impulse, one at each side of the central portion, and means differentially controlled by the selected portions whereby any difference in amplitudes of the selected portions is effective to accelerate or decelerate said driving means.

3. A system for synchronizing a periodic device with a series of incoming current impulses which comprises instrumentalities for producing in response to the incoming current of varying values, voltage impulses of one polarity, each of said voltage impulses being effective to produce a plurality of correcting pulses of the same polarity, and means including correcting circuits whereby each of said correcting pulses produces an effect upon said circuits which is nil, acceleratory or deceleratory in a manner proportional to and dependent upon the phase relation of said device with respect to said produced impulses.

4. In a telegraph system, synchronizing means comprising means for producing synchronizing impulses of constant polarity from received signal impulses, a rotary distributor comprising a ring of alternate live and dead segments, means for causing said synchronizing impulses to correct for departures from synchronism of said rotary distributor characterized in this, that it comprises two three-electrode vacuum tubes with their input circuits respectively connected to alternate live segments of said rotary distributor, to which said synchronizing impulses are applied, and with their output circuits including differential windings of an electromagnetic device, and means for driving said distributor, the speed of which is responsive to the flux in said electromagnetic device produced by the difference of the currents in said differential windings.

5. In a synchronizing system, a source of synchronizing impulses of constant polarity, a synchronous distributor, electromagnetic means comprising two mutually inductive differential windings, contacting means on said distributor for applying a plurality of correction pulses from portions of but not the whole of each synchronizing impulse equally or unequally to said differential windings depending on the phase of the distributor relative to the phase of the synchronizing impulses, and means associated with said electromagnetic means and with said rotary distributor responsive to unequal currents in said windings to retard or advance the speed of said distributor.

6. In a synchronizing system, a source of synchronizing impulses of constant polarity, a synchronous distributor, two three-electrode vacuum tubes having input circuits and output circuits, electromagnetic means comprising two mutually inductive differential windings, each of said windings being connected in the output circuit of one of said tubes, means on said distributor for applying a plurality of correcting pulses of the one polarity from the beginning and end of but not the middle of each of said synchronizing impulses equally or unequally to the input circuits of said tubes depending on the phase of the distributor relative to that of the synchronizing impulses, and means associated with said electromagnetic means and with said rotary distributor responsive to unequal current in said windings to retard or advance said distributor.

7. In a synchronizing system according to claim 6, the input circuit of each of said vacuum tubes comprises a condenser in the grid lead and a leak resistance between the grid and cathode.

8. In a synchronizing system, a source of synchronizing impulses of constant polarity, synchronous distributing means comprising alternate live and dead contacts, two conductors arranged to be respectively connected in repeated rotation to the alternate live contacts, a condenser connected to each conductor, electromagnetic means comprising two mutually inductive differential windings, a source of potential, two vacuum tubes each having a plate connected through one of said differential windings and said source of potential to its cathode and having the grid connected to one of said conductors on said synchronous distributor, a resistance connected between the grid and cathode of each tube, a second resistance connected between each conductor and the cathode of one tube, a connection between the cathode of each tube and one terminal of said source of synchronizing impulses and a connection between the other terminal and the contact of said synchronous distributing means and means associated with said electromagnetic means and with said distributing means responsive to unequal currents in said differential windings to retard or advance the speed of said distributing means.

9. A system for synchronizing an oscillatory device with a series of incoming current impulses which comprises instrumentalities for producing in response to the incoming impulses of one polarity voltage impulses of one polarity, the beginning and end of but not the middle of each of said voltage impulses being effective to produce a plurality of correcting pulses of the same polarity, and means for applying said correcting pulses to circuits including two differentially related vacuum tube elements connected to a magnetic core whereby the inductance of said core is controlled by the difference of the effects produced on said elements by said correcting pulses, and connections between said device and said core whereby the variation of magnetic condition of said core controls said device in a continuously proportional manner.

In witness whereof, I hereunto subscribe my name this 3 day of December, 1929.

WILLIAM A. KNOOP.